UNITED STATES PATENT OFFICE.

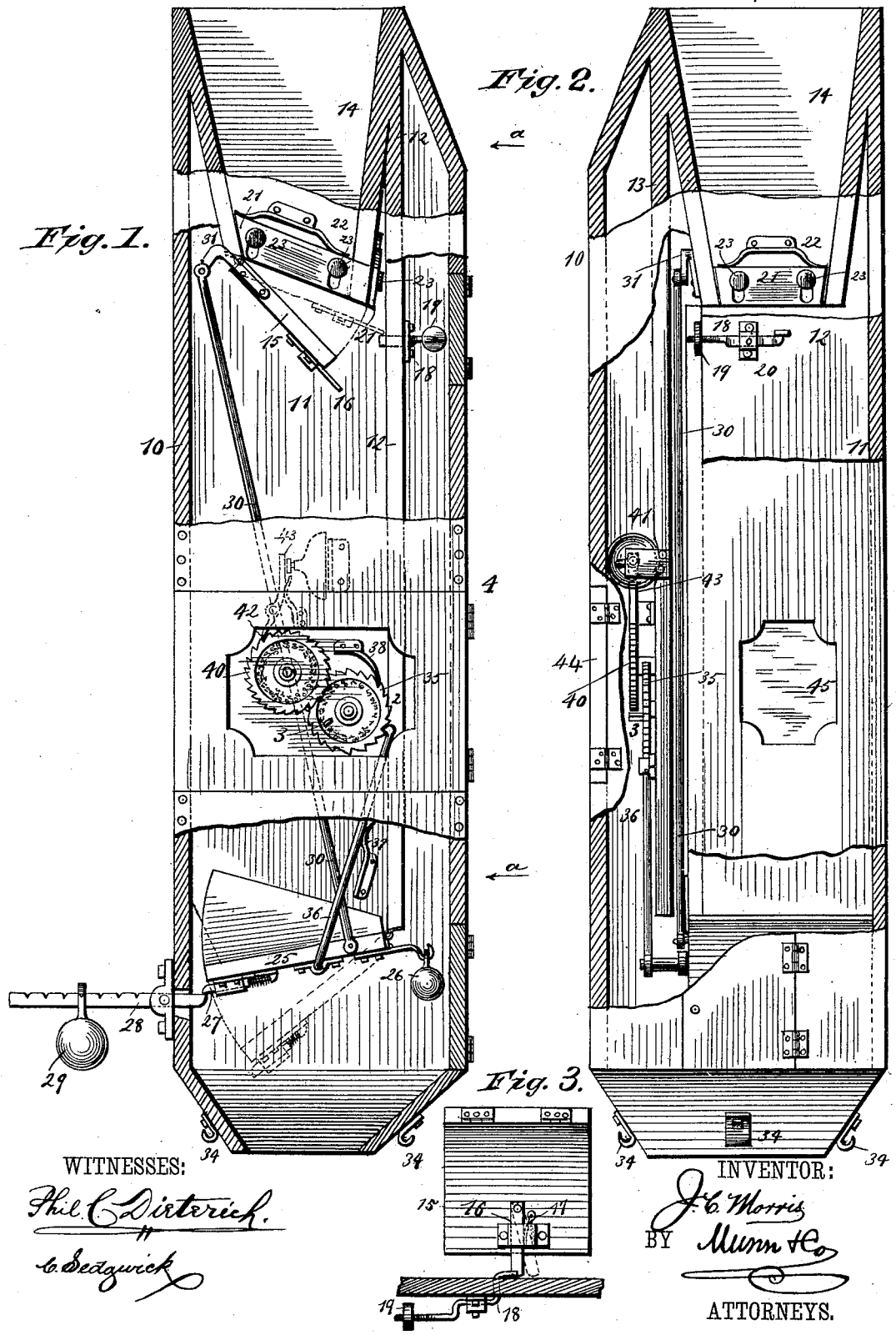

JOSEPH CLARKSON MORRIS, OF AZALIA, INDIANA.

AUTOMATIC GRAIN-WEIGHING MACHINE.

SPECIFICATION forming part of Letters Patent No. 378,969, dated March 6, 1888.

Application filed November 16, 1887. Serial No. 255,285. (No model.)

*To all whom it may concern:*

Be it known that I, JOSEPH CLARKSON MORRIS, of Azalia, in the county of Bartholomew and State of Indiana, have invented a new and Improved Automatic Grain-Weighing Machine, of which the following is a full, clear, and exact description.

This invention relates to grain-weighing machines; and it consists, essentially, of an automatic weighing or measuring apparatus that is applicable for use in connection with a separator or any other apparatus from which flowing grain is to be weighed.

Reference is to be had to the accompanying drawings, forming a part of this specification, in which similar figures of reference indicate corresponding parts in all the views.

Figure 1 is a face view of the machine, parts being broken away to disclose the interior construction. Fig. 2 is a side view of the machine, taken in the direction of the arrows *a a*, shown in connection with Fig. 1, parts in this view being also broken away; and Fig. 3 is an inverted plan view of the upper trap and its connections.

In constructing a weighing apparatus such as the one illustrated in the drawings above referred to, I provide a box-like structure, 10, in which there is arranged a feed-chute, 11, two of the walls of said chute being formed by the walls of the box-like structure 10, while the other walls are formed by partitions 12 and 13. In the upper portion of the chute I arrange a hopper, 14, the mouth of which is arranged to be closed by a trap, 15, that is hinged to one edge of the hopper; and this trap I provide with an outwardly-extending catch-arm, 16, which is pivotally connected to the under side of the trap and normally held in the position shown in full lines in Fig. 3 by a spring, 17. The end of this arm 16 engages with a lever arm or catch, 18, upon which there is adjustably mounted a weight, 19, the lever-arm being pivotally connected to the wall or partition 12 by means of a bracket, 20.

In connection with the hopper I arrange slides 21, that are normally held depressed by springs 22, said slides being connected to the hopper by studs 23, that pass through slots that are formed in the slides, and these slides serve to effectually stop the flow of grain when the trap 15 is closed.

At the lower end of the chute 11 I mount a trap, 25, which is normally held in a position to close the chute, as indicated in full lines in Fig. 1, by a weight, 26; and this trap I provide with a spring-pressed catch, 27, which, when the trap is closed, rests upon the upper face of the inner end or short arm of a lever, 28, the outer end or long arm of this lever carrying a weight, 29, which may be adjusted toward or from the fulcrum of the lever in order to regulate the amount of grain discharged at each tripping of the trap 25. The traps 25 and 15 are connected by a rod, 30, which rod is pivotally connected to the trap 25 at one end, while at the other end it is pivotally connected to an arm, 31, said arm being bolted to the trap 15.

In operation the grain is fed into the hopper 14, the trap 15 at this time being closed and the weight 19 adjusted so that after a predetermined amount of grain has been delivered to the hopper the weight of said grain will act to depress the trap against the action of said weight, the trap dropping to the position in which it is shown in Fig. 1, thus permitting the contents of the hopper to fall downward and into the chute 11; but as the trap 15 moves to its position the trap 25 will be moved upward to its closed position, and the grain falling downward within the chute 11 will strike against said trap 25, there to be held until a bushel of grain has been delivered thereto, after which, the weight 29 having been properly adjusted upon the lever 28, the weight of the grain will overcome the action of the weight 29, and the trap 25 will fall to the position indicated by dotted lines in Fig. 1, and in so falling will return the trap 15 to its closed position, the contents of the chute 11 being discharged into a sack or bag that is caught upon hooks 34, that are arranged about the lower end of the box 10. While the grain is being discharged from the chute 11 the catch 18 acts to hold the trap 15 in its closed position, as without said catch the weight of the grain delivered to the hopper 14 would throw the trap 15 downward and possibly close the trap 25 prior to the full delivery of the grain contained within the chute 11.

In order that a register may be kept of the amount of grain passing through the machine I provide a registering apparatus, which consists of a disk, 35, that is formed with a number of ratchet-teeth, 2, of which there are preferably twenty, and these teeth are engaged by the tooth formed at the upper end of a rod, 36, said rod being pivotally connected to the trap 25, the tooth of the rod being held in engagement with the ratchet-teeth 2 by a spring, 37, as illustrated, and all retrograde movement of the disk being prevented by a spring-catch tooth, 38, that is mounted as shown in Fig. 1. Upon the face of the disk 35 there is a projection, 3, which projection at every revolution of the disk 35 engages with one of the teeth of a disk, 40, that is preferably formed with twenty-five teeth that are numbered 20, 40, 60, and so on up to 500, the arrangement being such that at every revolution of the disk 35 the disk 40 will be advanced one step, a complete revolution of the disk 40 indicating that five hundred bushels of grain have passed through the apparatus.

In connection with the registering apparatus I arrange a gong, 41, which is sounded at every advance of the disk 40, the retaining-pawl 42, by which all retrograde movement of the disk 40 is prevented, being formed with an extending arm, 43, which bears against the plunger of the bell, so that as the pawl passes from tooth to tooth the gong-plunger will be forced in and an audible signal will be sounded.

Just in front of the registering apparatus I arrange a door, 44, in which there is a glass panel through which the apparatus may be seen, the door being provided in order that the apparatus may be set at zero prior to the commencement of the weighing of the grain; and in order that the operator may be able to inspect the grain passing through the chute 11 I provide a glass-covered sight-hole, 45, as shown in Fig. 2.

Having thus fully described my invention, I claim as new and desire to secure by Letters Patent—

1. In a grain-weighing machine, the combination, with a chute, of a hopper, a trap arranged beneath the hopper, a second trap arranged beneath the chute, weighted catches arranged in connection with the traps, and a rod by which the traps are connected, substantially as described.

2. In a grain-weighing machine, the combination, with a chute, of a hopper arranged above the chute, a trap mounted beneath the hopper, a catch-arm carried by the trap, a weighted lever with which the catch-arm engages, a second trap arranged at the lower end of the chute, connection between the two traps, a counterbalancing-weight carried by the second trap, a spring-catch also carried by the second trap, and a weighted lever with which said catch engages.

JOSEPH CLARKSON MORRIS.

Witnesses:
C. F. SPANELL,
J. F. MATSON.